United States Patent [19]

Chatterjee

[11] 4,252,924

[45] Feb. 24, 1981

[54] CONTINUOUS PROCESS FOR THE PREPARATION OF NONRANDOM ETHYLENE/ACID COPOLYMER

[75] Inventor: Asoke Chatterjee, Wilmington, Del.

[73] Assignee: E. I. Du Pont de Nemours and Company, Wilmington, Del.

[21] Appl. No.: 27,454

[22] Filed: Apr. 5, 1979

[51] Int. Cl.³ .................. C08F 2/02; C08F 265/02; C08F 267/02; C08F 8/44
[52] U.S. Cl. ............................ 526/65; 525/327; 525/328; 525/360; 525/366; 526/73; 526/317; 526/318
[58] Field of Search .............. 526/65, 16, 47, 73, 526/317, 329, 318; 525/327, 328, 360, 366

[56] References Cited

U.S. PATENT DOCUMENTS

| 3,264,272 | 10/1966 | Rees | 526/26 |
|---|---|---|---|
| 3,325,460 | 6/1967 | Schellenberg et al. | 526/65 |
| 3,520,861 | 7/1970 | Thomson et al. | 526/317 |
| 4,016,342 | 4/1977 | Wagensommer | 526/65 |
| 4,042,766 | 8/1977 | Tatsukami et al. | 526/16 |
| 4,042,768 | 8/1977 | Muller et al. | 526/65 |
| 4,061,847 | 12/1977 | Hughes et al. | 526/16 |

*Primary Examiner*—John Kight, III

[57] ABSTRACT

There is provided a continuous, steady state process for the preparation of nonrandom ethylene/$\alpha,\beta$-ethylenically unsaturated carboxylic acid copolymers in at least 2 constant environment, stirred autoclaves in series wherein the first autoclave is maintained at the pressure in the range of 800 to 3000 atmospheres (11.8 to 44.1 kpsi) and at a temperature in the range of 120° to 200° C. in a single phase reaction mixture at the given concentration of copolymer in the reaction mixture and at the given acid comonomer content of the copolymer and wherein each succeeding autoclave is maintained at a temperature of at least 30° C. in excess of the preceding autoclave. The compolymers thus obtained have a ratio of percent adjacent acid to weight percent acid in the copolymer of from above 0.44 to about 1.0. These copolymers have improved stiffness and are particularly useful in sheeting, blow molding, and packaging applications and for conversion to ionomers which are also useful for similar applications.

13 Claims, No Drawings

CONTINUOUS PROCESS FOR THE PREPARATION OF NONRANDOM ETHYLENE/ACID COPOLYMER

This invention relates to ethylene copolymers and more particularly it relates to a continuous process for preparation of ethylene/acid copolymers in at least two well-stirred autoclaves connected in series.

PRIOR ART

Solid ethylene/α,β-ethylenically unsaturated carboxylic acid (e.g., methacrylic acid) random copolymers (E/MAA) are known and widely used in both the free acid and or the partially neutralized derivatives (ionomers) because of their desirable properties and ease of fabrication. However, the copolymers and ionomers of commerce have limited stiffness, hardness, creep resistance, and high temperature resistance because the acid comonomer in a widely dispersed substantially random sequence distribution effectively destroyed the crystallinity without adding a compensating rigid structure.

Ethylene/methacrylic acid or ethylene/acrylic acid copolymers made in batch autoclave or continuous tubular reactors are random but not compositionally uniform.

Canadian Pat. No. 655,298 describes compositionally uniform, random ethylene copolymers with ethylenically unsaturated carboxylic acids containing up to 10 percent by weight acid. The examples show the preparation of copolymers containing up to 5.7% by weight acid comonomer. Because of their low comonomer content and their conditions of synthesis, the percent adjacent acid level of these copolymers is too low to result in a percent adjacent acid to weight percent acid in the copolymer ratio of 0.44 or higher.

Thomson and Waples U.S. Pat. No. 3,520,861 discloses a process for making in a continuous, well-stirred, autoclave ethylene copolymers said to have uniform composition and statistically random sequence distribution where "any regulating or ordered sequence . . . [is] negligible" (column 1, lines 65–68) containing from about 0.1 to about 35 percent acid such as acrylic, methacrylic or crotonic acid. These copolymers are disclosed to possess limited "rigidity" (stiffness). None of them appears to have greater than 31 kpsi rigidity and most of them, as indicated in the examples, are in the range of 10 to 20 kpsi. From their properties and from the theory of random copolymerization it is estimated that these copolymers have ratios of weight percent adjacent acid, to weight percent copolymerized methacrylic acid ratios of below 0.4 in the range of about 0.1 to 0.39.

SUMMARY OF THE INVENTION

According to the present invention, there is provided a process of preparing in at least two constant environment stirred autoclaves in series a nonrandom copolymer of ethylene and α,β-ethylenically unsaturated carboxylic acid, said acid having from 3 to 8 carbon atoms and said copolymer containing on a weight basis from about 6 to about 35 percent acid, having a melt index of from about 0.1 to about 800, and having a ratio of percent adjacent acid to total weight percent acid in the copolymer of from about 0.44 to about 1.0, said process comprising continuously charging ethylene, said acid and free radical initiator into the reaction zone of the first autoclave, maintaining said reaction zone in a steady state at a pressure in the range of 800 to 3000 atmospheres (11.8 to 44.1 kpsi) and at a temperature in the range of 120° to 200° C. in a single phase reaction mixture at the given concentration of copolymer in the reaction mixture and at the given acid comonomer content of the copolymer. The ethylene and acid are charged in a ratio of from about 15:1 to about 200:1, respectively, to each reactor. Fresh monomers and free radical initiators are fed continuously to each autoclave to maintain stable operation, the fraction of the total ethylene feed fed to the first autoclave being from about 0.3 to about 0.9 and the fraction of total acid feed fed to the first reactor being from about 0.3 to about 0.95. The reaction mixture from each autoclave is continuously removed and fed into the reaction zone of the succeeding autoclave, maintaining the reaction zone of each succeeding autoclave in a steady state at a temperature of at least about 30° C. in excess of the temperature in the reaction zone of the preceding autoclave and continuously removing the copolymer and unreacted monomer from the reaction zone of the last autoclave.

The copolymer made in the first autoclave is compositionally uniform. The copolymer made in the second, and any succeeding autoclave in series, is also compositionally uniform but partially grafted onto the copolymer from the preceding reactor.

In the context of the present invention the phrase "compositionally uniform" as it relates to copolymers means that substantially all of the copolymer molecules have substantially the same chemical composition while, of course, their molecular weight (length of the molecules) can vary.

DETAILED DESCRIPTION OF THE INVENTION

The present invention consists of a novel free radical polymerization process for making nonrandom ethylene copolymers having unique properties at high productivity rates and the nonrandom ethylene/acid copolymers produced. The present process is suitable for copolymers of ethylene and α,β-ethylenically unsaturated carboxylic acids having 3–8 carbon atoms. Examples of such monomers are acrylic acid, methacrylic acid, crotonic acid, itaconic acid, maleic acid, fumaric acid, monoesters of said dicarboxylic acids, such as methyl hydrogen maleate, methyl hydrogen fumarate, ethyl hydrogen fumarate and maleic anhydride.

Comonomer level shall be from about 6 to about 35 percent by weight, preferably 10 to about 25%. In this application all percent values for comonomers are weight percent unless otherwise noted.

The copolymers made according to the process of the present invention have a ratio of weight percent adjacent acid to weight percent acid in the copolymer of from about 0.44 to about 1.0, preferably from about 0.5 to about 0.8.

Two or more continuous, well-mixed, high-pressure autoclave reactors of length to diameter ratio (L/D) of from about 1:1 to about 3:1 are used in a series configuration. Preferably two autoclaves are employed.

The reaction in the first autoclave is maintained in the steady state at a pressure in the range of 800 to 3000 atmospheres (11.8 to 44.1 kpsi) and at a temperature in the range of 120° to 200° C. in a single phase reaction mixture at the given concentration of copolymer in the reaction mixture and at the given acid comonomer content of the copolymer. The reaction zone in each succeeding autoclave is maintained in a steady state at a temperature of at least about 30° C. in excess of the temperature in the reaction zone of the preceding autoclave.

Steady state reaction temperatures in the autoclaves shall generally be between about 120° C. and about 280° C. operated in such a manner that each successive reactor has a higher temperature than the previous one by at least 30° C. The first autoclave is operated at a temperature in the range of 120° to 200° C. The lower the first reactor temperature, within this range, the greater the degree of nonrandomness of the synthesized copolymer (as evidenced by increase of the weight percent adjacent acid content) with consequent greatest increase in stiffness.

Where methacrylic acid is the comonomer, preferably the reaction temperature in the first autoclave is from about 150° C. to about 175° C. and, in the succeeding autoclaves, from about 200° C. to about 250° C. In the case of acrylic acid, the temperatures required to make the products of this invention are substantially lower than for other acid comonomers. In general, for acrylic acid, the polymerization temperature should be substantially below 140° C., depending on pressure, monomer concentration, solvent concentration and residence time.

Reaction pressures range from about 800 to about 3000 atmospheres (11.8 to 44.1 kpsi), preferably from about 1450 to about 2100 atmospheres (21.3 to 30.9 kpsi). The succeeding reactors may have the same or different pressures.

The lower the reactor pressure is, within this range, the greater is the degree of nonrandomness in the copolymer and consequently, the greater the stiffness obtained.

To obtain stable reactor operation, monomer feed streams to the autoclaves are operated in such a manner that fresh monomers and free-radical initiator are fed in continuously and directly to each autoclave. The monomer feed ratio for each component is defined as the fraction of the total fresh component feed going into the first reactor. For example, if the total ethylene feed in E lbs/hour and only $Q_1$ lbs/hour goes to the first autoclave, then the feed ratio is defined as $Q_1/E$. In the present process, ethylene feed ratio may vary from 0.3 to 0.9 preferably from 0.35 to about 0.7 and the comonomer feed ratio may vary from about 0.3 to about 0.95, preferably from about 0.4 to about 0.9.

The ethylene and acid are charged in a ratio of from about 15:1 to above 200:1, respectively, preferably from about 20:1 to about 100:1.

Melt index values of the copolymers are between about 0.1 and about 800, preferably from about 0.5 to about 100.

The synthesis conditions selected for this process are such that single phase operation in each autoclave is maintained. The conditions under which a second phase separates from the fluid within the autoclave during the synthesis of ethylene/methacrylic acid copolymers depends upon the synthesis temperature, the synthesis pressure, the concentration of copolymer in solution (i.e., the overall conversion), the concentration of comonomer in the copolymer, the molecular weight (melt index) of the copolymer and the nature and amount of other substances present in the reaction mixture (e.g., benzene that may be used as an initiator carrier, acetone that may be used as a methacrylic acid carrier or cyclohexane that may be used as a telogen). Because of the large number of variables, it is not practical to define the exact conditions for all the states where two phases are formed in the synthesis solution. However, it is possible to test for the position of the phase boundary by observing changes in the process and the product when synthesis conditions are changed in a regular manner (for example, by decreasing the synthesis temperature or pressure in small steps) to pass through that boundary. In going from one-phase operation to two-phase operation in such a test, the process will show an increase in initiator demand, will develop a significant temperature spread in the reactor, form adhesions within the reactor, cause pressure instabilities and slow down the stirring at constant power or require more power to maintain constant speed. At the same time, the product from these tests produced in the two-phase region of operation will show a narrower molecular weight distribution by gel permeation chromatography, a decrease in the slope of the shear rate-shear stress curve for the melt, an increase in the environmental stress crack resistance, an increase in the maximum draw rate for film or filament, and an increase in the Percent Adjacent Acid. The magnitude of these changes will, of course, depend upon the magnitude of the stepwise changes and of the composition of the two phases, but those skilled in the art can determine the position of the phase boundary by using these criteria.

Other reaction conditions are similar to those employed in the general practice of high pressure free-radical polymerization of ethylene. Different free-radical initiators, of half-lives less than 0.1 minute at each autoclave operating temperature, are fed in directly to each autoclave at rates controlled to maintain steady-state operating conditions. Feed temperatures can be as desired, with preferred feed temperatures between $-20°$ C. and $+70°$ C. Melt index, a measure of polymer molecular weight, is controlled by adjusting flow of molecular weight modifiers (telogens) such as hydrogen, propane, acetone and so on.

The acid groups in the polymer can be neutralized with metal cations having an ionized valence of from one to three inclusive when the unsaturated acid is a monocarboxylic acid and an ionized valence of one when the unsaturated acid is a dicarboxylic acid and the metal cations being selected from the group consisting of uncomplexed and complexed metal ions, to form ionically crosslinked materials termed ionomers, which are thermoplastic at processing temperatures as taught in U.S. Pat. No. 3,264,272. Neutralization ranges are from about 5 percent to about 90 percent by weight. Melt indexes for the ionomers are within the range 0.01 to 100, preferably 0.2 to 30.

Although the present invention primarily relates to physically distinct well-mixed autoclave reactors connected in series, similar reactions can be carried out in a single autoclave reactor of L/D>3 baffled so as to provide separate reaction zones each completely and uniformly mixed but in sequential contact with each other. Differential feeding of monomers and initiators to each well-mixed reaction zone will be required.

Copolymers of ethylene with $\alpha,\beta$-ethylenically unsaturated acids made according to above process are substantially nonrandom in character as characterized by infrared techniques of percent adjacent acid measurements. They have higher stiffness than random copolymers of equivalent acid content. The products made in the process have characteristic properties of the first reactor conditions and not simply a blend of materials made separately in the two autoclaves. The uniqueness of the process is that it allows ethylene acid copolymers and ionomers to be made economically and at high production rates while maintaining the unique properties imparted by the nonrandomness of the comonomer sequence distribution.

It is known in the art (cf. U.S. Pat. No. 3,178,404 to Vaughn and Hagemeyer) that decreasing the temperature and increasing the pressure in the synthesis of polyethylene homopolymer decreases the short chain branching in the product, and that lower short chain branching in a polyethylene homopolymer gives higher crystallinity in the product [cf. Sperati, Franta and Starkweather, J. Am. Chem. Soc. 75, 6127 (1953)], and that higher crystallinity in a polyethylene homopolymer gives higher density, stiffness, yield point, hardness, Vicat temperature and other properties (ibid.).

It is also known in the art [cf. Kamath and Wakefield, J. Appl. Pol. Sci. 9, 3153 (1965)] that introducing a comonomer into the polyethylene chain disrupts the crystallinity proportionally to the comonomer content until all the crystallinity (as measured by x-ray) is gone at about 30% comonomer. This loss of crystallinity is accompanied by a loss in the crystallinity dependent properties since it is the crystalline matrix that gives these properties.

I have also observed the disappearance of crystallinity with increasing comonomer content in the ethylene/methacrylic acid copolymers, and crystallinity is substantially absent above about 30% comonomers. It is unexpected and most surprising that the unique copolymers, despite loss of crystallinity, retain excellent and superior solid state properties. The expected loss of stiffness, Vicat temperature and yield point are observed with prior art random copolymers having a low ratio of the Percent Adjacent Acid to Weight Percent Methacrylic Acid up to about 25% total copolymerized comonomer.

When the comonomer content of the copolymers is increased above about 25% the stiffness and yield strength increase above the minimum values found at about 25% comonomer. Also, when the acid copolymers are even partially neutralized by metal ions the stiffness and yield strength increase above that of the unneutralized product. These increases have been attributed to the formation of glassy domains, a new phase (different from the polyethylene crystallites and the rubbery amorphous regions) that precipitates from the polymer because of high polarity [cf. pp. 156 ff in R. Longworth's Chapter 2 of the book "Ionic Polymers" L. Holliday, ed., John Wiley & Sons, New York (1975)]. These glassy domains coexist with the polyethylene crystallites and the rubbery amorphous region and will contribute to the stiffness and yield strength if they are present in sufficient numbers. High concentrations of acid comonomer and the partial neutralization increase the amounts of glassy domains in the copolymer because of the solubility limits of these materials.

The nonrandom ethylene/methacrylic acid copolymers that have a high ratio of Percent Adjacent Acid to Weight Percent Methacrylic Acid also decrease in crystallinity with increase in comonomer content. But the products show higher stiffness and higher yield strength than homopolymers of ethylene made under the same conditions. Their Vicat temperatures are lower than those of polyethylene homopolymer but higher than those of prior art, random copolymers having the same comonomer content but lower ratios of Percent Adjacent Acid to Weight Percent Methacrylic Acid. I attribute this result to the presence of larger amounts of the glassy domains in structures that are able to contribute substantially to stiffness and strength but which soften and disintegrate at lower temperatures than similar structures formed by polyethylene crystallites.

It is surprising that the sequence distribution of the ethylene/methacrylic acid copolymers can be changed by changing synthesis conditions. It is further surprising that increasing the amount of adjacent acid in the copolymer would affect the volume, size or structure of the glassy domains at a constant comonomer content, especially in the tiny amounts that they are present and to the extent that properties are changed.

The following examples serve to illustrate the present invention. All parts and percentages and proportions are by weight unless otherwise indicated.

Ethylene and methacrylic acid were copolymerized to products containing 6 to 18% by weight methacrylic acid in a series of examples summarized in Tables III, IV, V, and VI. These runs were carried out in a continuous manner in a set of two well-mixed, stirred autoclaves connected in series to each other. The reaction product of the first autoclave together with the unreacted monomers are piped into the second autoclave. Examples 1 through 18 were made in two autoclaves in series of similar volume (720 ml) with a L/D of 1.24. Examples 19 through 21 were made with the second autoclave having a volume of 325 ml with a L/D of 1.1. The autoclaves were equipped with baffles and sealed magnetic drives for pitched blade agitators rotating at 1500 to 1800 rpm. The power input, in horsepower per one thousand gallons of autoclave content was about 600 for the autoclaves of Examples 1 to 18 and 1000 for the autoclave of Examples 19 to 21. The agitators were designed so that a solvent flow could be continuously metered in to keep the shaft and agitator blades clean of polymer deposits. The solvent used was a 75/25 by volume mixture of t-butanol and methanol, as also used for the initiator solvent. Alternatively t-butyl benzene can be used. The autoclaves were also equipped with several feed inlets through which the monomers, initiators and molecular weight regulators (telogens) could be introduced.

The autoclaves were fitted with external heating devices to assist in the start-up (or "light-off") of the reaction. Subsequent steady-state operation was controlled by adjusting flow of initiators to maintain the rate of the exothermic reaction to control the temperature. The feed mixture comprised ethylene and methacrylic acid in the proper proportion to make the copolymer desired. A portion of the total feed was always diverted directly to the second autoclave.

The telogens used to control molecular weight were either cyclohexane, acetone or methanol. Propane or other telogens for ethylene polymerization can be used to control molecular weight.

Monomer feed rates varied from 10 to 21 lbs/hr which corresponds to a main residence time in the 720 ml autoclave of about 4.7 to 2.2 minutes and in the 325 ml autoclave of about 2.0 to 1.0 minutes respectively. The surface to volume ratio for the autoclaves was 0.61 cm. The free-radical initiators are chosen according to the temperature of operation. Usually azo or peroxide compounds were used as shown below.

| Temp. Range | Compound | Half Life <0.1 Min |
|---|---|---|
| 120–170° C. | Di(sec butyl) | 127° C. |

| Temp. Range | Compound | Half Life <0.1 Min |
|---|---|---|
| | peroxydicarbonate | |
| | Azo-bis-isobutyronitrile | — |
| | t-Butyl peroxypivalate | 142° C. |
| 170–210° C. | tert-butyl perisobutyrate | |
| | 2-tert-butyl azo-2-cyano-4 methoxy 4-methyl pentane | 154° C. |
| 190–240° C. | tert-butyl peracetate | |
| | tert-butyl peroctoate | 160° C. |
| | 2-tert-butylazo-2-cyano-butane | 186° C. |
| 230–270° C. | di-tert-butyl peroxide | |

The amount of initiator is adjusted to control reaction temperature at the desired level. A solution of initiator in a 75/25 by volume mixture of t-butanol and methanol was usually prepared and pumped directly to the autoclaves.

The monomers were compressed up to operating pressures by means of a bank of high pressure compressors.

The reaction product was released from the second autoclave through an automatic pressure let-down valve into a product can at ambient pressure. The internal pressure of the reactors was controlled by this let-down valve which was heated to prevent fouling by polymer deposition. Most of the unreacted ethylene methacrylic acid and solvent was flashed off to the disposal system. The solid polymer was removed, allowed to cool, cut into cubes in a cutter and extruded in a single screw extruder with vacuum devolatilization. The extruded, homogenized copolymers were analyzed for physical properties. Some copolymer compositions were directly reacted with appropriate amounts of aqueous sodium hydroxide in a roll mill at 150° C. to make the corresponding ionomers. The ionomers were characterized in detail.

The properties shown were determined as follows:

Acid content in weight percent was measured by titration at 75° to 90° C. in a 75 xylene/25 n-butanol by volume, mixture with 0.1 normal methanolic potassium hydroxide using a phenolphthalein end point.

Percent neutralization of the ionomer product was measured by back titration of excess standard hydrochloric acid with standard tetramethyl ammonium hydroxide solution, using a Thymol Blue end point.

The "Percent Adjacent Acid" was measured by infrared absorbance at 5.65 microns of a lightly pyrolyzed solution of the copolymer. Heating a dry solution of about one gram of the ethylene/methacrylic acid copolymer in 100 ml of an equal volume mixture of Decalin ® decahydronaphthalene and "Ansul Ether" 161, triethylene glycol dimethyl ether, at about 200° C. for about one hour causes conversion of essentially all of the adjacent methacrylic acid units to cyclic anhydride as shown by the equation below:

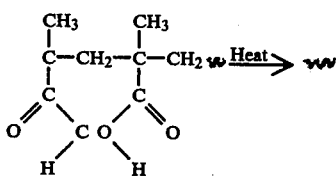

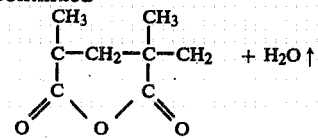

A calibration constant for the infrared absorbance of the carbonyl at 5.65 microns was determined using glutaric anhydride which absorbs at the same infrared wavelength as the carbonyl of the cyclic anhydride obtained from two methacrylic acid units next to each other in the polymer chain. The absorbance at this wavelength was then measured for the hot pyrolyzed solution against a solution of pivalic acid to compensate for the unreacted acid. The Percent Adjacent Acid was calculated using the equation:

$$\% \text{ Adj. Acid} = \frac{A}{W \times M} \times \frac{100\%}{K}$$

where
% Adj. Acid = the percent adjacent acid based on the total acid present
A = infrared absorbance of the sample at 5.65 microns
W = the weight of sample per 100 ml solution
M = the fractional concentration of acid in the copolymer
K = the calibration constant obtained at 5.65 microns with glutaric anhydride which equals 3.2 in the I.R. equipment which was used with a 0.5 mm cell.

The value of the Percent Adjacent Acid obtained in this way is the same both on weight and mole basis The pyrolysis also converts some of the isolated methacrylic acid units to anhydride, but the linear anhydride absorbs sharply at 5.53 microns and does not interfere seriously with the determination of the cyclic anhydride at the 5.65 micron wavelength.

The precision of the test method for percent adjacent acid was determined to be ±0.8 percent adjacent acid (95% confidence limit) at a level of 5% adjacent acid. This method will not measure with accuracy the true amount of methacrylic acid in sequence longer than one (i.e., total amount of methacrylic acid diads, triads, tetrads, etc.) for copolymers that contain large amounts of sequences longer than diads. The polymers of this invention do not contain significant amounts of such because of the low molar concentrations of acid comonomer; for example even a copolymer containing 35 weight percent comonomer will have less than 3% of its comonomer in triads which will be measured as 2% in diads for an error of 1%. For lower total weight percent comonomer, the amount in triads is greatly diminished. For the purposes of the present invention sequences longer than diads are not considered. The novel copolymers of the present invention are characterized by the property "Percent Adjacent Acid" as measured by the test described above.

The ratio of the percent Adj. Acid to total weight percent MAA is obtained by dividing the measured value of the "Weight Percent Adjacent Acid" by the measured value of the "Total Weight Percent Methacrylic Acid".

Melt index is measured by ASTM D-1238-57T (condition E) in g/10 minutes.

Stiffness is measured by ASTM D-747-58T in kpsi = 1000 lb/sq in.

Flexural modulus is measured by ASTM D-790 in kpsi=1000 lb/sq in.

Tensile yield strength in psi are on die cut specimens (using a modified die C of ASTM D-412-51T) pulled at 20 inches per minute.

"N/D" in the Tables signifies that the value was not determined. N/A in the Tables signifies "not applicable".

COMPARATIVE EXAMPLES C1 THROUGH C16

Polyethylene and certain ethylene copolymers such as ethylene-vinyl acetate can be made in two well-mixed, continuous autoclaves in series configuration, with each autoclave being operated at a different temperature, different amount and kind of initiator, different fresh monomer feed ratio and under pressures of 800 to 3000 atmospheres (11.8 to 44.1 kpsi). When made in this manner, the properties of the final product are those of a blend of polymers made in each of the autoclaves under its particular reaction conditions. Thus the molecular weight, density, etc. of the final product can be predicted from calculations of products made under each autoclave condition alone.

Table IA and IB list data for Comparative Examples C1 through C16.

In Examples C1 through C10, the flexural moduli are estimated from the densities using the equations developed from actual experimental data. In Examples C1 through C4 a set of 9.3 weight percent vinyl acetate copolymers were made in two autoclaves in series as described above. Second autoclave temperatures were increased from 235° to 280° C. with a decline in flexural modulus from 22.1 kpsi to 17.8 kpsi, a decline of 19.4% from the original value in contrast to ethylene/methacrylic acid copolymers made in series reactors. Examples C5 through C10 show data for the same 9.3 weight The flexural modulus of a blend of two polymers is well approximated by a logarithmic blending rule.

The equation is given below:

$$\ln(FM_{A+B}) = W_A \ln FM_A + (1 - W_A) \ln FM_B$$

where:
FM$_A$ = flexural modulus of Polymer A
FM$_B$ = flexural modulus of Polymer B
FM$_{A+B}$ = flexural modulus of blend of A+B
W$_A$ = weight fraction of Component A Utilizing this equation and the data in Table IA from comparative examples C5 through C10, it will be seen that, for example, C1 which is a blend of C5 and C8 in the proportion of their amounts made in the autoclave would be, for W$_A$=0.634, which is the fraction of polymer made in the first autoclave.

$$\begin{aligned} FM_{(C5 + C8)} &= \exp(W_A \ln FM_{C5} + (1 - W_A) \ln FM_{C8} \\ &= \exp(0.634 \ln 26.5 + 0.366 \ln 15.8) \\ &= \exp(2.0777 + 1.0102) = \exp(3.0878) \\ &= 21.9 \text{ kpsi.} \end{aligned}$$

In other words, the flexural modulus of a blend of ethylene/vinyl acetate copolymers containing 63.4 weight % from Example C5 and 36.6 weight % from Examples C8 has a calculated flexural modulus of 21.9 kpsi in comparison to the 22.1 kpsi which was measured for the flexural modulus of sample C1 made in series reactors (see Table IA).

From the above comparison, it is apparent that the ethylene/methacrylic acid copolymers of this invention made in series reactors are not mere blends but are unique, non-random copolymers having unexpected, surprising properties.

TABLE IA

| | Examples | | | | | | | | | |
|---|---|---|---|---|---|---|---|---|---|---|
| | C1 | C2 | C3 | C4 | C5 | C6 | C7 | C8 | C9 | C10 |
| Pressure, Both Reactors, KPSI | 26.5 | 26.5 | 26.5 | 26.5 | 27.0 | 27.0 | 27.0 | 27.0 | 27.0 | 27.0 |
| TR$_1$ °C. | 160 | 160 | 160 | 160 | 160 | 180 | 200 | 240 | 260 | 280 |
| TR$_2$ °C. | 235 | 245 | 265 | 280 | N/A | N/A | N/A | N/A | N/A | N/A |
| Density | 0.9340 | 0.9332 | 0.9315 | 0.9302 | 0.9374 | 0.9356 | 0.9334 | 0.9282 | 0.9256 | 0.9232 |
| % VA | 9.3 | 9.3 | 9.3 | 9.3 | 9.3 | 9.3 | 9.3 | 9.3 | 9.3 | 9.3 |
| Flexural Modulus, KPSI | 22.1 | 21.2 | 19.2 | 17.8 | 26.5 | 24.1 | 21.4 | 15.8 | 13.4 | 11.4 |
| Fraction of Polymer in Reactor 1 | 0.634 | 0.604 | 0.553 | 0.520 | N/A | N/A | N/A | N/A | N/A | N/A |
| Melt Index of Polymer in Reactor 1 | 0.3 | 0.19 | 0.08 | ND | | | | | | |
| Reactor 2 | 53.4 | 69.6 | 110.5 | ND | N/A | N/A | N/A | N/A | N/A | N/A |
| Final Melt Index | 2.0 | 2.0 | 2.0 | ND | 2.0 | 2.0 | 2.0 | ND | ND | ND |
| Fraction of Feed to Reactor 1 | 1.0 | 1.0 | 1.0 | 1.0 | N/A | N/A | N/A | N/A | N/A | N/A | percent vinyl acetate copolymer made in a single reactor at temperatures of 160° to 380° C. In this case, the flexural modulus declined from 26.5 to 11.4 kpsi, a decline of 57%, similar to what is observed for ethylene/methacrylic acid copolymers (see Table II, C17 to C20).

Comparative examples C11 through C16 in Table IB show an analogous situation for a 4% vinyl acetate copolymer. It is seen that similar declines of stiffness occurs when the second reactor temperature is increased from 200° to 260° C., for series reactor run Examples C11 through C13. The stiffness declines by 46% from 40.2 to 21.4 kpsi.

For the single reactor runs, Examples C14 through C16, it is seen that as before the stiffness declines as the reactor temperature increases. The amount of decrease is 47% from the original value. The stiffness value for a blend of C14 and C16 polymer prepared in the ratio of C12 (i.e., 0.59 in reactor 1 and 0.41 in reactor 2) gives the following:

$$\text{Stiffness of the blend} = \exp[0.59 \ln 38.3 + 0.41 \ln 20.2]$$
$$= \exp[3.3831]$$
$$= 29.4 \text{ kpsi}$$

This is close to the experimentally determined value of 28.5 for comparative C12 made in a series reactor at 150° and 234° C., in the first and second reactors respectively.

From both the two sets of comparative examples C1 through C10 and C11 through C16, it is seen that for certain ethylene polymers such as ethylene-vinyl acetate, etc. made in dual series autoclaves, the properties of the final product, such as stiffness is a blend of the properties of products made under the corresponding single autoclave conditions. It is also apparent that as the second reactor temperature is increased keeping the first autoclave temperature constant, substantial decreases of stiffness are noted.

COMPARATIVE EXAMPLES C17 THROUGH C20

Ethylene/methacrylic acid copolymers containing from 9 to 11 weight percent of acid were made in a single well-stirred autoclave. These polymers were made in a single 720 ml autoclave of L/D of 1.24, equipped with pitched blade agitators rotating at 1500–1800 rpm imparting a power-input of 600 hp/1000 gallons reactor contents. Telogens, solvent flush, appropriate initiators and other conditions were as described in preceding examples. Synthesis conditions and properties are summarized in Table II.

It is seen that as the synthesis temperature increases from 190° to 245° C. the stiffness declines 53% from 19 to 9 kpsi. The percent conversion per pass which is a measure of productivity, increases from 11.8 to 18.6.

TABLE IB

| | Examples | | | | | |
|---|---|---|---|---|---|---|
| | C11 | C12 | C13 | C14 | C15 | C16 |
| Reactor Pressure Both Reactors (KPSI) | 27 | 27 | 27 | 27 | 27 | 27 |
| Temp. | | | | | | |
| Reactor 1, °C. | 150 | 150 | 150 | 150 | 210 | 240 |
| Reactor 2, °C. | 200 | 234 | 260 | N/A | N/A | N/A |
| % VA | 4 | 4 | 4 | 4 | 4 | 4 |
| Stiffness, KPSI | 40.2 | 28.5 | 21.4 | 38.3 | 24.7 | 20.2 |
| Fraction of Polymer in Reactor 1 | 0.71 | 0.59 | 0.52 | N/A | N/A | N/A |

TABLE II

| | Examples | | | |
|---|---|---|---|---|
| | C17 | C18 | C19 | C20 |
| Reactor Pressure KPSI | 24 | 24 | 24 | 24 |
| Reactor Temp. °C. | 160 | 190 | 235 | 245 |
| % Acid | 11 | 9 | 9 | 10 |
| Stiffness, KPSI | 34 | 19 | 13 | 9 |

TABLE II-continued

| | Examples | | | |
|---|---|---|---|---|
| | C17 | C18 | C19 | C20 |
| Melting Point °C. | N/D | N/D | 104.7 | N/D |
| % Conversion | 9.5 | 11.78 | 15.2 | 18.6 |

EXAMPLE 1 THROUGH 4

In these examples, summarized in Table III ethylene-methacrylic acid copolymers of this invention of percent acid between 6 to 8, and derived sodium ionomers were made in a dual series autoclave system as described previously using a feed ratio in the first autoclave of 0.67 for both ethylene and methacrylic acid.

The first autoclave temperature was kept constant at 200° C. while the second autoclave temperature was varied from 265° to 280° C. The data indicates, that unlike what would be expected from the results of Table IA and IB (comparative Examples C1 to C5 and C11 to C13) stiffness values remain essentially unchanged.

Other solid state properties, such as the melting points and tensile yield strengths, are also unaffected. This is a very surprising and unexpected result. It indicates that the final polymer obtained from the dual series autoclave system is really a function of the first autoclave synthesis conditions, and is not a mere physical blend of the two individual autoclave products.

TABLE III

| | Ex. 1 | Ex. 2 | Ex. 3 | Ex. 4 |
|---|---|---|---|---|
| Reactor Pressure, KPSI | 27 | 27 | 27 | 27 |
| Temp., °C. | | | | |
| First Reactor | 200 | 200 | 199 | 200 |
| Second Reactor | 265 | 269 | 275 | 280 |
| Feed Ratio | | | | |
| % Acid | 7.38 | 7.85 | 6.2 | 6.3 |
| % Neutralization with Sodium Ion | ND | 39.9 | 43.9 | 52.8 |
| Stiffness, KPSI | | | | |
| Copolymer | 13.4 | 18.8 | 18.7 | 18.7 |
| Ionomer | 26.8 | 27.2 | 26.8 | 26.7 |
| Melting Point, °C. | | | | |
| Copolymer | 104.8 | 103.8 | 105.5 | 105.1 |
| Ionomer | 102.5 | 103.0 | 104.8 | 103.5 |
| Tensile Strenght at yield, KPSI | | | | |
| Copolymer | 1779 | 1208 | 1250 | 1136 |
| Ionomer | 2670 | 2660 | 2520 | 2610 |
| Melt Index | | | | |
| Ionomer | 3.36 | 1.88 | 3.64 | 2.62 |
| Copolymer | 19.5 | 23 | 37.8 | 30.5 |

EXAMPLES 5 THROUGH 9

Ethylene/methacrylic acid copolymers were prepared in a dual series autoclave process according to the process of preceding examples. In this set of experiments the second autoclave temperature was kept constant at 280° C. and the first autoclave temperature was gradually increased from 180° C. to 200° C. As the data indicate, the stiffness of the copolymer products declined 20%, from 20.6 to 16.4 kpsi over this range.

This illustrates the fact that the stiffness of the final polymer depends on the first autoclave synthesis conditions, primarily temperature. Similar observations can be made for different ranges of first and second autoclave temperatures.

Conditions and properties are summarized in Table IV.

TABLE IV

|  | Ex.5 | Ex.6 | Ex. 7 | Ex. 8 | Ex. 9 |
|---|---|---|---|---|---|
| Reactor Pressure |  |  |  |  |  |
| Both Reactors, KPSI | 27 | 27 | 27 | 27 | 27 |
| Temperature, °C. |  |  |  |  |  |
|   First Reactor | 180 | 185 | 190 | 195 | 200 |
|   Second Reactor | 280 | 280 | 280 | 280 | 280 |
| % Acid | 8.8 | 7.3 | 6.9 | 7.9 | 7.0 |
| % Neutralization |  |  |  |  |  |
| (Sodium Ion) | 48 | 54 | 56 | 48 | 45 |
| Stiffness, KPSI |  |  |  |  |  |
|   Copolymer | 20.6 | 18.8 | 18.2 | 18.6 | 16.4 |
|   Ionomer | 33.7 | 30.3 | 29.4 | 27.3 | 26.7 |
| Melt Index |  |  |  |  |  |
|   Copolymer | 24.8 | 55.3 | 45.6 | 36.2 | 38.7 |
|   Ionomer | 1.97 | 3.38 | 3.33 | 2.82 | 4.71 |
| Tensile Strength at yield, KPSI |  |  |  |  |  |
|   Copolymer | 1184 | 1108 | 1145 | 1176 | 1097 |
|   Ionomer | 3152 | 2337 | 2560 | 2647 | 2617 |
| Melting Point, °C. |  |  |  |  |  |
|   Copolymer | 105.3 | 105.1 | 104.9 | 104.2 | 104.7 |
|   Ionomer | 104.7 | 103.0 | 103.3 | 102.7 | 103.0 | calculated according to the equations given in Comparative Examples 1–4.

It is seen from the data that the flexural modulus of the blends C23 and C26 are lower by 36 and 32 percent, respectively, compared to the corresponding series reactor synthesized products given in Examples 10 and 11. The calculated flexural moduli of the blends and the measured moduli are within the experimental error of the measurements.

This illustrates the surprising discovery that the series reactor products in Examples 10 and 11 have higher stiffness than would be expected from the synthesis conditions. The properties are largely a function of first reactor conditions alone rather than a blend of the properties of copolymers which would have been expected to have been produced in single reactors under the two separate sets of conditions. And the rate of production depends on the synthesis conditions of the second reactor (i.e., the novel polymers are produced at the high conversion of the second reactor). This offers an economically attractive process to make these useful, high stiffness copolymers and ionomers.

TABLE V

|  | Examples |  |  |  |  |  |  |  |
|---|---|---|---|---|---|---|---|---|
|  | C21 | C22 | C23 | C24 | C25 | C26 | 10 | 11 |
| Blend of Two Single-Reactor Materials in Proportion to their Conversion |  |  |  |  |  |  | Series Reactor Prod. ↓↓↓↓ | Series Reactor Prod. ↓↓↓↓ |
|  | 75% | 25% | Blend | 75% | 25% | Blend |  |  |
| Temp., °C. |  |  |  |  |  |  |  |  |
|   First Reactor | 173 | 235 | N/A | 168 | 235 | N/A | 171 | 172 |
|   Second Reactor | N/A | N/A | N/A | N/A | N/A | N/A | 230 | 234 |
| Pressure, KPSI | 24 | 27 | N/A | 24 | 27 | N/A | 24 | 24 |
| % Acid | 11.8 | 15 | 12.5 | 17.7 | 15 | 17 | 12.2 | 16.6 |
| % Neutralization |  |  |  |  |  |  |  |  |
| (Sodium ion) | 54 | 59 | 56 | 54 | 59 | 55 | 56 | 51 |
| Stiffness, KPSI | 54 | N/D | N/D | 81 | N/D | N/D | 59 | 73 |
| Flexural Modulus, KPSI | 69 | 48 | 58 | 93 | 48 | 72 | 79 | 95 |
| Calculated |  |  | 63 |  |  | 79 |  |  |
| Melt Index | 1.89 | 0.70 | N/D | 0.87 | 0.70 | N/D | 8.5 | 5.2 |
| Melting Point, °C. | 103.8 | N/D | 104.9 | 102.0 | N/D | 102.7 | 101.3 | 104.3 |
| % Conversion | 10.7 | 15.2 | N/A | 10.1 | 15.2 | N/A | 17.4 | 16.2 |

EXAMPLES 10 AND 11 AND COMPARATIVE EXAMPLES C21 TO C26

Comparative Examples C21 and C24 are nonrandom ethylene/methacrylic acid copolymers and derived ionomers made in a single 720 ml autoclave under synthesis temperatures of 168° and 173° C., respectively. Acid levels were 11.8 and 17.7 percent by weight, respectively. Stiffness and flexural modulus were found to be higher than that expected for random copolymers of similar acid content made at higher reactor temperatures. The conversions per pass are low, 10.7 and 10.1%. Comparative Example C22 is a commercial random ethylene/methacrylic acid copolymer prepared under 235° C. autoclave temperature in a single autoclave.

Comparative Examples C23 and C26 are physical blends prepared by roll milling appropriate amounts of C21 with C22 and C24 with C25, respectively. Flexural moduli of these blends were measured and was also

EXAMPLES 10 THROUGH 21 AND COMPARATIVE EXAMPLES C21-C22

Examples 10 through 21 range in methacrylic acid contents from 6.2 to 17.6 percent by weight, with copolymer melt indexes from 17.4 to 389. The percent conversion ranges from 14.4 to 17.4. The first reactor temperature varies from 150° to 172° C. and second reactor from 208° to 234° C. Conditions and properties of the copolymer products are summarized in Table VI.

The property data show that both the stiffness and flexural modulus of the copolymer products and ionomers of this invention are similar to single reactor, compositionally uniform, nonrandom resins of comparable acid and neutralization levels as shown in C21 and C24 comparative examples. The productivity increase in the process of this invention over a single reactor process is substantial. For similar sets of resins, e.g., Example 10 and C21 the conversion per pass was increased 63% from 10.7 in case of C21 to 17.4 in case of Example 10.

The adjacent acid values of the copolymer products are the same within experimental error for both the single reactor and series reactor products, a surprising discovery.

The ratio of percent adjacent acid to percent total acid is a measure of properties of the polymers. For polymers as made in this process, this ratio is greater than 0.44 as shown in the table.

Other properties remain significantly unchanged except for tensile impact which shows a slight decline of 12% over the single reactor examples C21 and C24.

These data indicate that the advantages attained by running an ethylene/unsaturated acid copolymer at low reactor temperatures in the first reactor, are maintained in series configuration with a higher second reactor temperature. The overall production rate is increased considerably over the single reactor conditions making commercial production attractive and economically feasible.

TABLE VI

| | Examples | | | | | | | | | | | | | |
|---|---|---|---|---|---|---|---|---|---|---|---|---|---|---|
| | 10 | 11 | 12 | 13 | 14 | 15 | 16 | 17 | 18 | 19 | 20 | 21 | C21 | C24 |
| Reactor Pres., KPSI | 24 | 24 | 24 | 24 | 27 | 27 | 27 | 27 | 27 | 27 | 27 | 27 | 24 | 24 |
| Temp. °C., Reactor 1 | 171 | 172 | 171 | 170 | 152 | 150 | 150 | 150 | 150 | 160 | 172 | 169 | 173 | 168 |
| Temp., °C., Reactor 2 | 230 | 234 | 230 | 232 | 208 | 211 | 210 | 210 | 210 | 222 | 223 | 223 | N/A | N/A |
| Feed Temp., °C. | 30 | 30 | 30 | 30 | 0 | −1 | −3 | −1 | 0 | 5 | 10 | 5 | 30 | 30 |
| Feed Ratio, Total Monomer | 0.74 | 0.74 | 0.74 | 0.74 | 0.67 | 0.67 | 0.67 | 0.67 | 0.67 | 0.67 | 0.67 | 0.67 | N/A | N/A |
| Initiator Demand | | | | | | | | | | | | | | |
| lbs/1000 lbs polymer | 0.55 | 0.553 | 0.724 | 0.852 | 0.393 | 0.349 | 0.399 | 0.383 | 0.317 | 0.868 | 1.12 | 1.40 | 1.58 | 1.32 |
| % Conversion | 17.4 | 16.2 | 16.9 | 14.4 | 16.0 | 16.0 | 15.8 | 15.7 | 15.3 | 16.3 | 15.9 | 16.4 | 10.7 | 10.1 |
| % Acid | 15.2 | 17.6 | 14.4 | 15.6 | 7.2 | 6.5 | 6.8 | 6.2 | 6.2 | 13.3 | 13.8 | 14.2 | 11.8 | 17.7 |
| % Adjacent Acid | N/D | 7.8 | N/D | 7.2 | 3.1 | N/D | N/D | N/D | N/D | 7.4 | N/D | 7.7 | 5.7 | 7.9 |
| [% Adj. Acid] [Total Acid%] | N/D | 0.44 | N/D | 0.46 | 0.43 | N/D | N/D | N/D | N/D | 0.56 | N/D | 0.54 | 0.48 | 0.45 |
| % Neutralization (Sodium ion) | 56 | 51 | 54 | 45 | 42 | 45 | 44 | 48 | 48 | 57 | 53 | 47 | 54 | 54 |
| Properties[1] | | | | | | | | | | | | | | |
| Melt Index | | | | | | | | | | | | | | |
| Copolymer | 389 | 315 | 290 | 237 | 35.4 | 39.6 | 34.3 | 17.4 | 29.6 | 40 | 51 | 54 | 32.8 | 36.7 |
| Ionomer | 8.47 | 5.18 | 3.32 | 5.38 | 3.81 | 3.11 | 3.04 | 3.02 | 2.34 | 0.45 | 0.45 | 0.49 | 1.89 | 0.87 |
| Stiffness, KPSI | 59 | 73 | 61 | 68 | 39 | 39 | 39 | 38 | 37 | 51 | 53 | 49 | 54 | 81 |
| Flexural Modulus, KPSI | 79 | 95 | 84 | 90 | 47 | 52 | 50 | 55 | 52 | 76 | 79 | 89 | 69 | 93 |
| Elmendorf Tear, gms/mil | 27 | 29 | 34 | 30 | 59 | 61 | 61 | 58 | 62 | 33 | 35 | 42 | 64 | 61 |
| Tensile Impact, ft.lb./in$^2$ | 120 | 113 | 112 | 95 | ND | ND | ND | ND | ND | 185 | ND | 165 | 207 | 191 |
| Tensile Strength (Maximum), KPSI | 3.4 | 3.7 | 3.6 | 3.7 | 1.9 | 1.9 | 1.9 | 1.95 | 1.9 | 4.7 | 4.8 | 3.2 | 3.69 | 4.65 |
| % Elongation | 180 | 130 | 150 | 140 | 540 | 517 | 503 | 457 | 517 | 460 | 450 | 320 | 373 | 367 |
| Melting Point, °C. | 101.3 | 103.1 | 102 | 104.3 | 110.8 | 110.5 | 109.6 | 111.7 | 111.7 | 107 | 105 | 104.3 | 103.8 | 102.0 |
| Freezing Point, °C. | 57 | 57.1 | 56.4 | 68.2 | 87.0 | 88.5 | 88.9 | 90.5 | 91.0 | 70.8 | 65.3 | 64 | 74 | 56 |

[1]Unless expressly noted as copolymer, property data are for the sodium ionomer.

I claim:

1. A process of preparing in at least 2 constant environment stirred autoclaves in series a nonrandom copolymer of ethylene and an α,β-ethylenically unsaturated carboxylic acid, said acid having from 3 to 8 carbon atoms and said copolymer containing on a weight basis, from about 6 to about 35 percent acid, having a melt index of from about 0.1 to about 800, and having a ratio of percent adjacent acid to weight percent acid in the copolymer of from about 0.44 to about 1.0, said process comprising continuously charging ethylene, said acid and free radical initiator into the reaction zone of the first autoclave, maintaining said reaction zone in a steady state at a pressure in the range of 800–3000 atmospheres (11.8 to 44.1 kpsi) at a temperature in the range of 120° to 200° C. in a single-phase reaction mixture at the given concentration of copolymer in the reaction mixture and at the given acid comonomer content of the copolymer, the ethylene and acid being charged in a ratio of from about 15:1 to about 200:1, respectively, to each autoclave while feeding fresh monomers and initiator continuously to each autoclave to maintain stable operation, the ethylene feed ratio to the first autoclave being from about 0.3 to about 0.9 and the acid feed ratio being from about 0.3 to about 0.95, continuously removing the reaction mixture from each autoclave and feeding it into the reaction zone of the succeeding autoclave, maintaining the reaction zone of each succeeding autoclave in a steady state at a temperature of at least about 30° C. in excess of the temperature in the reaction zone of the preceding autoclave and continuously removing the copolymer and unreacted monomer from the reaction zone of the last autoclave.

2. The process of claim 1 wherein two autoclaves are employed.

3. The process of claim 2 wherein the ethylene and acid are charged in a ratio of from about 20:1 to about 100:1, respectively.

4. The process of claim 3 wherein the ethylene feed ratio to the first autoclave is from about 0.35 to about 0.7 and the acid feed ratio is from about 0.4 to about 0.9.

5. The process of claim 4 wherein the acid is methacrylic acid.

6. The process of claim 1 wherein the temperature range in all autoclaves is from about 120° C. to about 280° C. and the pressure is from about 800 to about 3000 atmospheres (11.8 to 44.1 kpsi).

7. The process of claim 6 wherein 2 autoclaves are employed.

8. The process of claim 7 wherein the temperature in the first autoclave is from about 120° C. to about 200° C.

9. The process of claim 8 wherein the temperature in the first autoclave is from about 150° C. to about 175° C., the temperature in the second autoclave is from about 200° C. to about 250° C. and the pressure in the first and second autoclaves is from about 1450 to about 2100 atmospheres (21.3 to 30.9 kpsi).

10. The process of claim 9 wherein the acid is methacrylic acid, the ethylene and acid are charged in a ratio of from about 20:1 to about 100:1, the ethylene feed ratio to the first reactor is from about 0.35 to about 0.7 and the acid feed ratio is from about 0.4 to about 0.9.

11. A nonrandom copolymer of ethylene and an α,β-ethylenically unsaturated carboxylic acid, said acid having from 3 to 8 carbon atoms and said copolymer containing, on a weight basis, from about 6 to about 35 percent copolymerized acid, having a melt index from about 0.1 to about 800, and having a ratio of percent adjacent acid to weight percent acid in the copolymer of from about 0.44 to about 1.0 made by the process of claim 1.

12. A nonrandom copolymer according to claim 11 in which the α,β-ethylenically unsaturated carboxylic acid is methacrylic acid.

13. An ionomer produced from the nonrandom copolymer of claim 12 in which from 5% to 90% of the acid groups in the copolymer have been neutralized with metal cations having an ionized valence of from one to three inclusive and said metal cations being selected from the group consisting of uncomplexed and complexed metal ions.

* * * * *